US012370660B2

(12) United States Patent
Shige et al.

(10) Patent No.: US 12,370,660 B2
(45) Date of Patent: Jul. 29, 2025

(54) DRIVING TOOL

(71) Applicant: KOKI HOLDINGS CO., LTD., Tokyo (JP)

(72) Inventors: Tetsuhito Shige, Ibaraki (JP); Daiki Kiyohara, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 191 days.

(21) Appl. No.: 17/622,405

(22) PCT Filed: May 29, 2020

(86) PCT No.: PCT/JP2020/021330
§ 371 (c)(1),
(2) Date: Dec. 23, 2021

(87) PCT Pub. No.: WO2020/261878
PCT Pub. Date: Dec. 30, 2020

(65) Prior Publication Data

US 2022/0355452 A1 Nov. 10, 2022

(30) Foreign Application Priority Data

Jun. 27, 2019 (JP) ................................ 2019-119303

(51) Int. Cl.
*B25C 1/00* (2006.01)
*B25C 1/06* (2006.01)
*B25C 7/00* (2006.01)

(52) U.S. Cl.
CPC ................ *B25C 1/06* (2013.01); *B25C 1/005* (2013.01)

(58) Field of Classification Search
CPC .. B25C 1/00; B25C 1/06; B25C 1/005; B25C 1/008; B25C 7/00

(Continued)

(56) References Cited

U.S. PATENT DOCUMENTS 5,667,127 A 9/1997 Ichikawa et al.
5,988,477 A * 11/1999 Deieso .................... B25C 1/008
227/156

(Continued)

FOREIGN PATENT DOCUMENTS

JP S55-89578 U 6/1980
JP H05-49278 U 6/1993

(Continued)

OTHER PUBLICATIONS

Partial Supplementary European Search Report issued in the European Application No. 20830770.2 dated Jul. 13, 2022.

(Continued)

*Primary Examiner* — Anna K Kinsaul
*Assistant Examiner* — Patrick B Fry
(74) *Attorney, Agent, or Firm* — Rimon P.C.

(57) ABSTRACT

A driving tool capable of suppressing the increase in the number of components is provided. The driving tool includes an ejection unit 23 to which a fastener is supplied and a striking unit capable of moving with respect to the ejection unit 23 so as to drive the fastener supplied to the ejection unit 23 into a workpiece, and the driving tool further includes a first push lever 74 capable of contacting with and separating from the workpiece and capable of moving with respect to the ejection unit 23, a second push lever 135 capable of moving in conjunction with the first push lever 74, and a blade guide 120 and a cover 30 having a function to guide a movement of the first push lever 74 and the second push lever 135 with respect to the ejection unit 23 in a predetermined direction.

11 Claims, 13 Drawing Sheets

(58) Field of Classification Search
USPC .......................................................... 227/156
See application file for complete search history.

(56) References Cited

U.S. PATENT DOCUMENTS

| | | | | |
|---|---|---|---|---|
| 8,550,324 | B2 * | 10/2013 | Coleman | B25C 1/008 227/8 |
| 10,759,030 | B2 * | 9/2020 | Pomeroy | B25C 1/047 |
| 11,407,094 | B2 * | 8/2022 | Peng | B25C 1/047 |
| 2006/0091177 | A1 * | 5/2006 | Cannaliato | B25C 1/008 227/8 |
| 2009/0001119 | A1 * | 1/2009 | Osuga | B25C 1/008 227/10 |
| 2013/0334277 | A1 * | 12/2013 | Shima | B25C 1/06 318/114 |
| 2018/0126531 | A1 * | 5/2018 | Pomeroy | B25C 1/06 |
| 2018/0154505 | A1 * | 6/2018 | Sato | B25C 1/047 |
| 2021/0031347 | A1 | 2/2021 | Sato et al. | |

FOREIGN PATENT DOCUMENTS

| | | | |
|---|---|---|---|
| JP | 3243927 | B2 | 1/2002 |
| JP | 2002-283253 | A | 10/2002 |
| JP | 2014-108468 | A | 6/2014 |
| WO | 2006/040911 | A1 | 4/2006 |
| WO | 2016/199670 | A1 | 12/2016 |

OTHER PUBLICATIONS

International Search Report issued in corresponding International Application No. PCT/JP2020/021330, dated Jul. 21, 2020 w/machine English translation.

Office Action dated Jun. 24, 2024, from corresponding Taiwan Patent Application No. 109113472, 24 pages.

* cited by examiner

23: EJECTION UNIT
30: COVER
74: FIRST PUSH LEVER
120: BLADE GUIDE
135: SECOND PUSH LEVER

DRIVING TOOL

CROSS REFERENCE TO RELATED APPLICATIONS

This application is the U.S. National Phase under 35 U.S.C. § 371 of International Patent Application No. PCT/JP2020/021330, filed on May 29, 2020, which claims the benefits of Japanese Patent Application No. 2019-119303, filed on Jun. 27, 2019, the entire contents of each are hereby incorporated by reference.

TECHNICAL FIELD

The present invention relates to a driving tool including an ejection unit, a striking unit configured to strike a fastener supplied to the ejection unit, a first push lever capable of moving with respect to the ejection unit, and a second push lever capable of moving in conjunction with the first push lever.

BACKGROUND ART

Patent Document 1 discloses an example of a driving tool including an ejection unit, a striking unit configured to strike a fastener supplied to the ejection unit, a first push lever capable of moving with respect to the ejection unit, and a second push lever capable of moving in conjunction with the first push lever. The driving tool disclosed in Patent Document 1 includes a main body, an ejection unit, a striking unit, a cylinder, a trigger, a first push lever, a second push lever, and a magazine. The ejection unit is provided on the main body, and the first push lever and the second push lever can move with respect to the ejection unit. The magazine stores fasteners and the fasteners are sent to the ejection unit. The cylinder is provided in the main body and the striking unit can be actuated along the cylinder.

In the driving tool disclosed in Patent Document 1, compressed air is supplied into the main body. When the trigger is operated and the ejection unit is pressed to the workpiece, the compressed air is supplied into the cylinder. The striking unit is actuated by the pressure of the compressed air in the cylinder and strikes the fastener sent to the ejection unit. In the driving tool disclosed in Patent Document 1, the driving depth of the fastener can be adjusted by adjusting the positions of the first push lever and the second push lever with respect to the ejection unit.

RELATED ART DOCUMENTS

Patent Documents

Patent Document 1: Japanese Patent No. 3243927

SUMMARY OF THE INVENTION

Problem to be Solved by the Invention

The inventors of this application have recognized the problem that the number of components increases when a member for setting a moving direction of a push lever with respect to the ejection unit is provided for each of the first push lever and the second push lever.

An object of the present invention is to provide a driving tool capable of suppressing the increase in the number of components.

Means for Solving the Problems

A driving tool according to an embodiment includes an ejection unit to which a fastener is supplied and a striking unit capable of moving with respect to the ejection unit so as to drive the fastener supplied to the ejection unit into a workpiece, and the driving tool further includes a first push lever provided in the ejection unit, capable of contacting with and separating from the workpiece, and capable of moving with respect to the ejection unit, a second push lever provided in the ejection unit and capable of moving in conjunction with the first push lever, and a guide member having a function to guide a movement of the first push lever and the second push lever with respect to the ejection unit in a predetermined direction.

Effects of the Invention

In the driving tool according to an embodiment, the moving directions of the first push lever and the second lever with respect to the ejection unit are set by a shared guide member. Therefore, it is possible to suppress the increase in the number of components of the driving tool.

DETAILED DESCRIPTION OF PREFERRED EMBODIMENTS

An embodiment of the driving tool according to the present invention will be described with reference to drawings.

Figure 1:
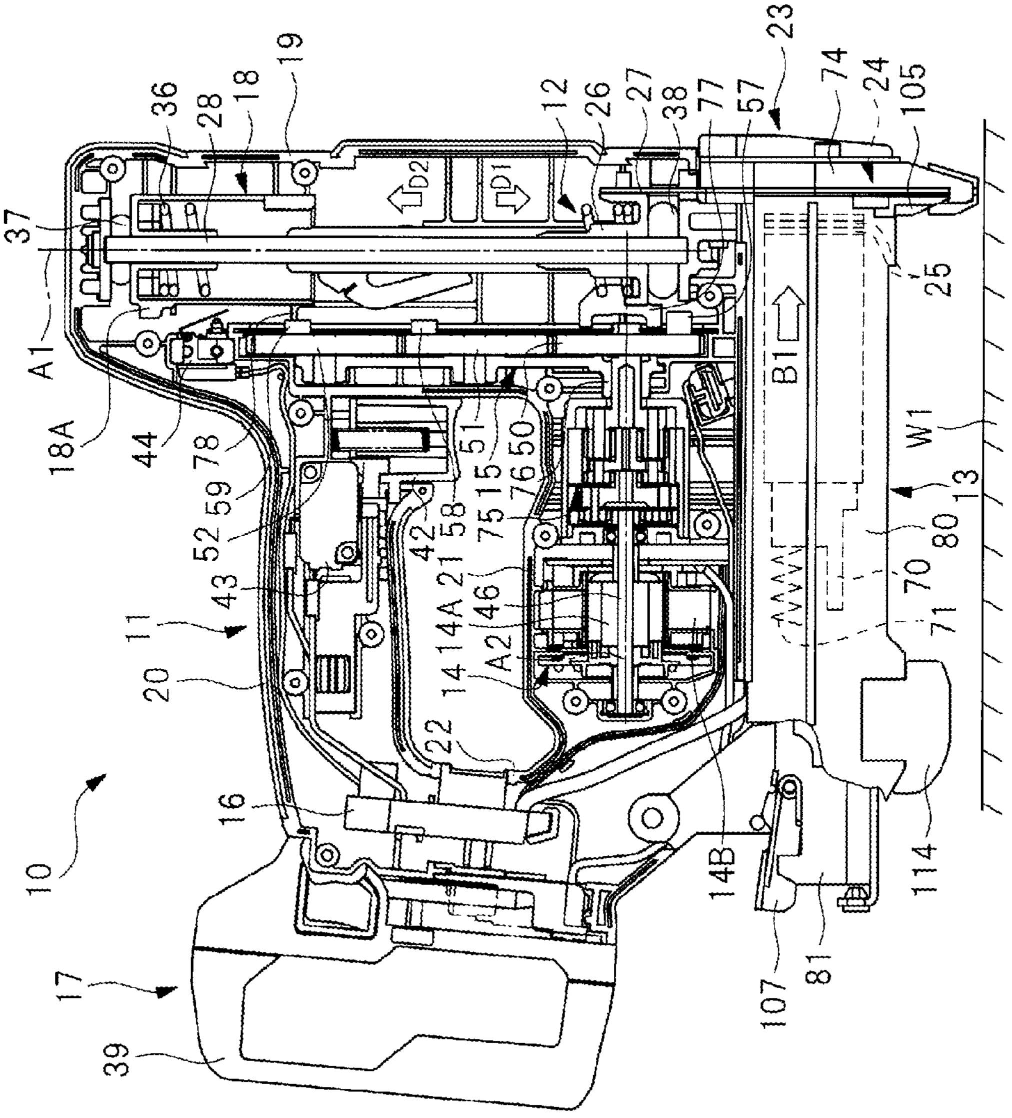
FIG. 1 is a side cross-sectional view showing a driving tool according to an embodiment of the present invention.

A driving tool 10 shown in FIG. 1 includes a housing 11, a striking unit 12, a magazine 13, an electric motor 14, a conversion mechanism 15, a control unit 16, a battery pack 17 as a power supply unit, and a weight 18. The housing 11 has a cylindrical main body 19, a handle 20 connected to the main body 19, and a motor case 21 connected to the main body 19. A mounting unit 22 is connected to the handle 20 and the motor case 21.

The striking unit 12 has a plunger 26 arranged in the main body 19 and a driver blade 27 fixed to the plunger 26. The driver blade 27 is made of metal. A guide shaft 28 is fixed in the main body 19. A center line A1 is the center of the guide shaft 28. The plunger 26 is attached to the guide shaft 28, and the striking unit 12 can move in the direction along the center line A1.

An ejection unit 23 is provided outside the main body 19 and is attached to the main body 19. The ejection unit 23 can be defined as a nose unit. The ejection unit 23 has a blade guide 120, a magazine plate 105, and a cover 30. The blade guide 120 may made of either metal or synthetic resin. The magazine plate 105 may be made of metal or synthetic resin. The cover 30 may be made of metal or synthetic resin. An ejection path 24 is formed of the blade guide 120 and the magazine plate 105. The ejection path 24 may be any one of a groove, a passage, a hole, and a space. The driver blade 27 can move in the ejection path 24.

Figure 2:
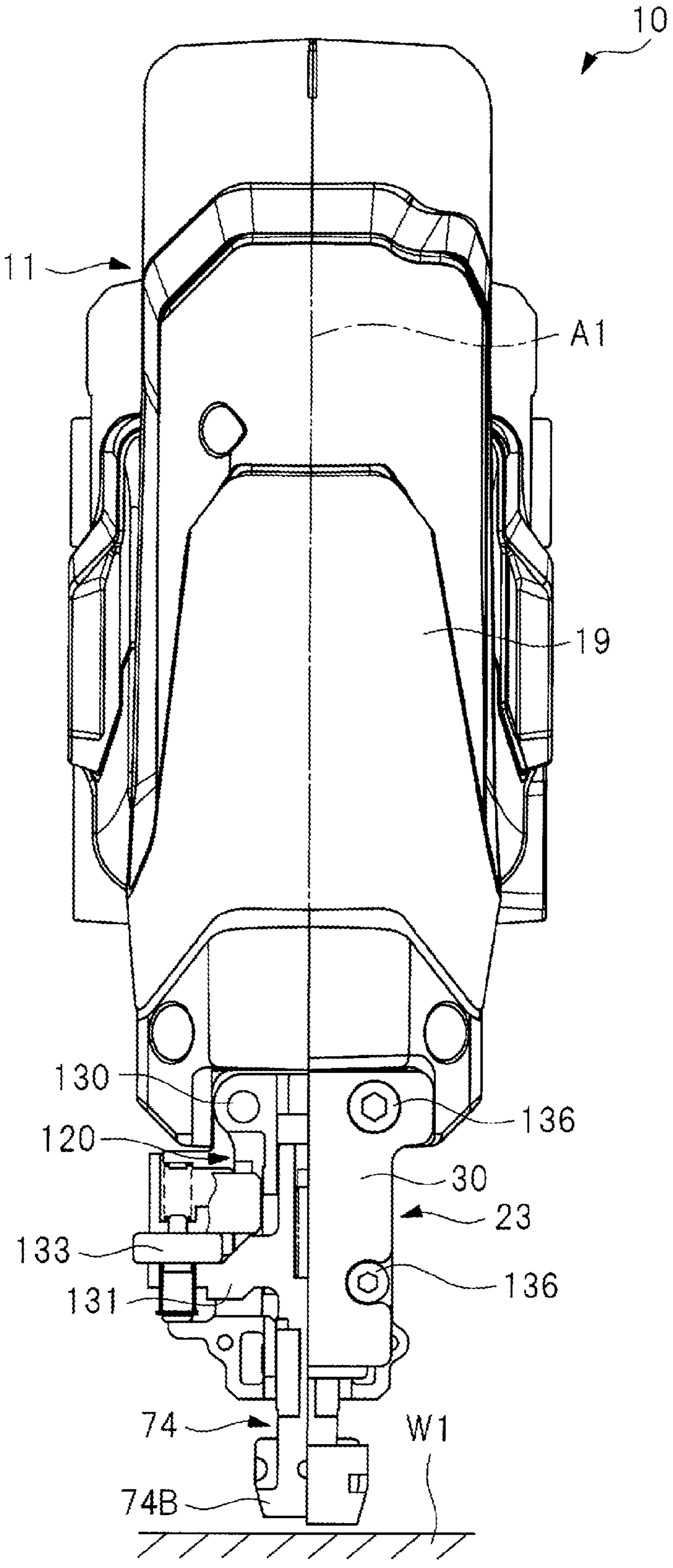
FIG. 2 is a partially cutaway front view of the driving tool.
Figure 3:
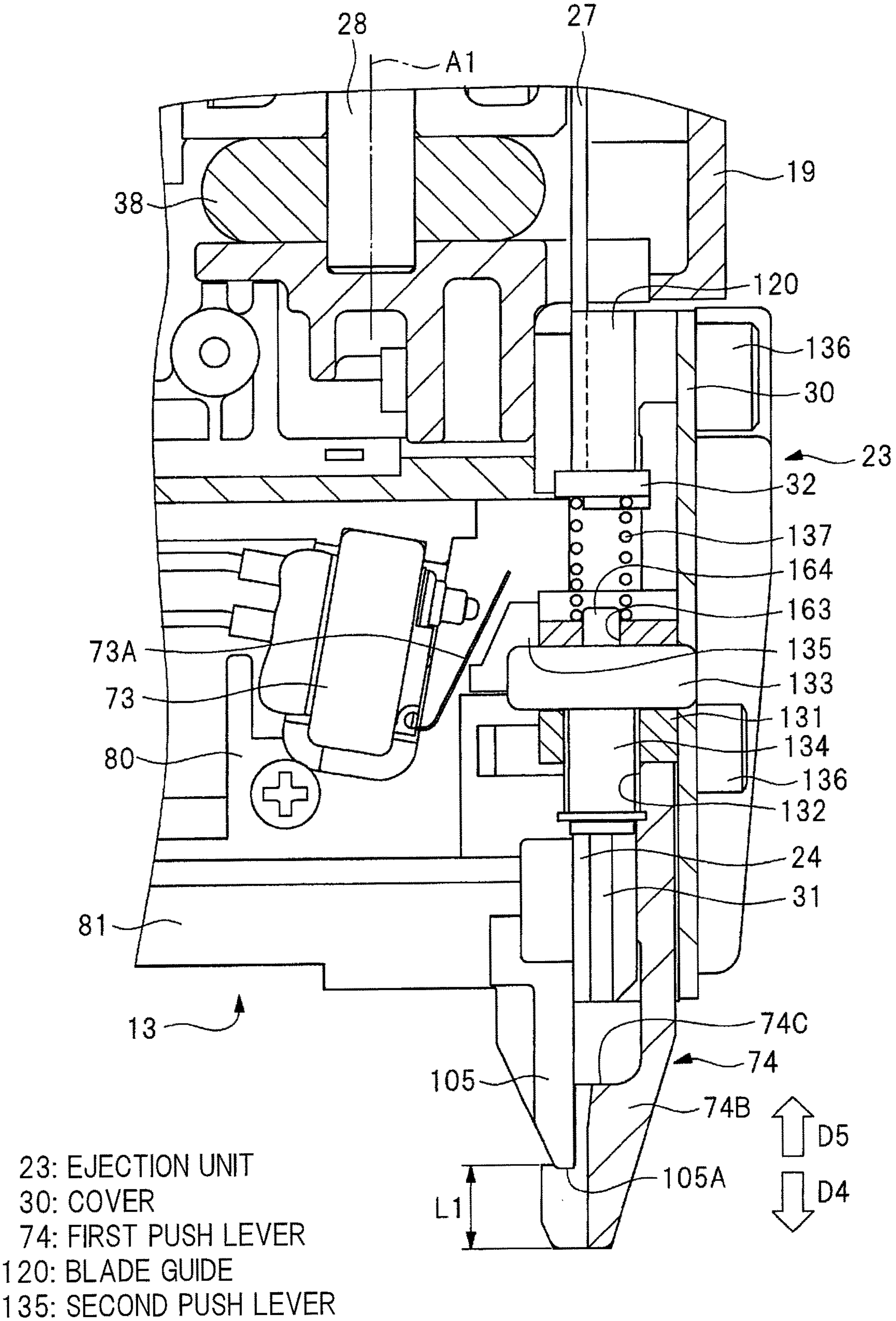
FIG. 3 is a side cross-sectional view of an ejection unit including a specific example 1 of a positioning mechanism.

As shown in FIG. 2 and FIG. 3, a first push lever 74 is attached to the ejection unit 23. The first push lever 74 can move and stop with respect to the ejection unit 23. By contacting with the driver blade 27, the ejection unit 23 prevents the driver blade 27 from moving in a direction intersecting the center line A1. The magazine 13 is supported by the ejection unit 23 and the housing 11.

The weight 18 shown in FIG. 1 suppresses the recoil received by the housing 11. The weight 18 is made of metal as an example. The weight 18 is attached to the guide shaft 28. A weight arm portion 35 is provided on the weight 18. The weight 18 is attached to the guide shaft 28. The weight 18 can move in the direction along the center line A1. The weight 18 has a protrusion 18A protruding from the outer surface.

A metal spring 36 is arranged in the main body 19, and the spring 36 is arranged between the plunger 26 and the weight 18 in the direction along the center line A1. The plunger 26 receives a biasing force in a first direction D1 toward the ejection unit 23 from the spring 36 in the direction along the center line A1. The weight 18 receives a biasing force in a second direction D2 away from the ejection unit 23 from the spring 36 in the direction along the center line A1. The first direction D1 and the second direction D2 are opposite to each other. A weight bumper 37 and a plunger bumper 38 are provided in the main body 19. Both the weight bumper 37 and the plunger bumper 38 are made of synthetic rubber.

In FIG. 1, the movement of the striking unit 12, the plunger 26, or the weight 18 in the first direction D1 is referred to as the downward movement. The movement of the striking unit 12, the plunger 26, or the weight 18 in the second direction D2 is referred to as the upward movement. Each of the striking unit 12 and the weight 18 can reciprocate in the direction along the center line A1.

The battery pack 17 can be detachably attached to the mounting unit 22. The battery pack 17 has a storage case 39 and a plurality of battery cells stored in the storage case 39. The battery cell is a secondary battery that can be charged and discharged, and any of a lithium ion battery, a nickel hydrogen battery, a lithium ion polymer battery, and a nickel cadmium battery can be used as the battery cell. The battery pack 17 is a DC power supply, and a voltage is applied from the battery pack 17 to the electric motor 14.

Figure 4:
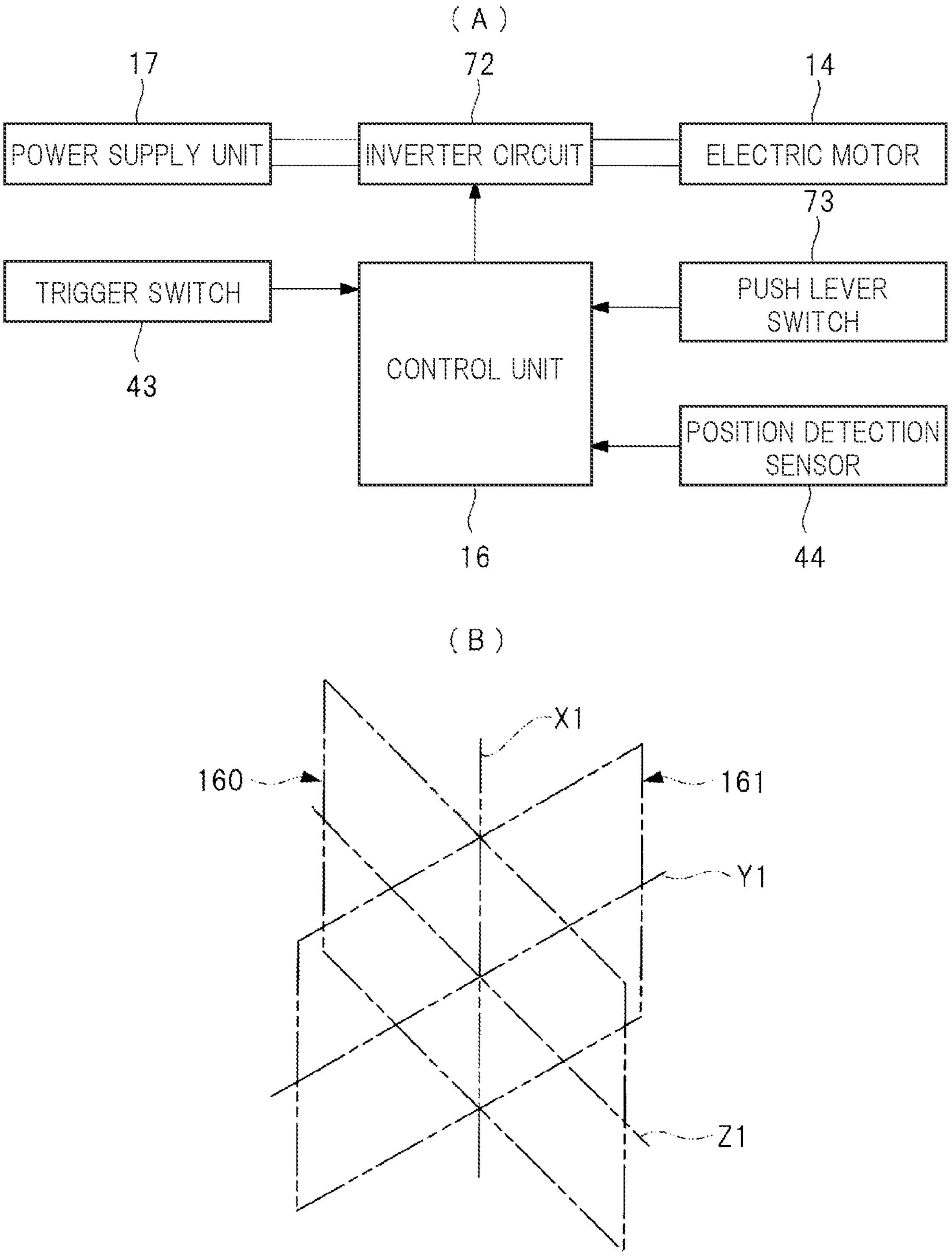
FIG. 4(A) is a block diagram showing a control system of the driving tool and FIG. 4(B) is a coordinate system showing a positioning direction of an element of the driving tool.

The control unit 16 shown in FIG. 1 is provided in the mounting unit 22, and the control unit 16 is a microcomputer having an input port, an output port, an arithmetic processing unit, and a storage unit. A trigger 42 and a trigger switch 43 shown in FIG. 1 are provided on the handle 20, and the trigger switch 43 is turned on when a user applies an operation force to the trigger 42. When the user releases the operation force applied to the trigger 42, the trigger switch 43 is turned off. An inverter circuit 72 shown in FIG. 4(A) is provided in the motor case 21. The inverter circuit 72 includes a plurality of switching elements that can be turned on and off.

A position detection sensor 44 is provided in the housing 11. The position detection sensor 44 is, for example, a micro switch. When the protrusion 18A of the weight 18 comes into contact with the position detection sensor 44, the position detection sensor 44 is turned on. When the protrusion 18A is separated from the position detection sensor 44, the position detection sensor 44 is turned off. The signal output from the position detection sensor 44 is input to the control unit 16. The control unit 16 processes the signal of the position detection sensor 44 to estimate the positions of the plunger 26 and the weight 18 in the direction along the center line A1.

A push lever switch 73 is provided in the magazine 13. The push lever switch 73 is a contact switch having a contact piece 73A. The push lever switch 73 outputs signals by detecting that the first push lever 74 is moved by being pressed to the workpiece W1 and that the first push lever 74 is moved by being separated from the workpiece W1. The control unit 16 receives the signal of the trigger switch 43, the signal of the push lever switch 73, and the signal of the position detection sensor 44, and outputs a signal for controlling the inverter circuit 72.

The electric motor 14 has a rotor 14A and a stator 14B, and a motor shaft 46 is attached to the rotor 14A. In the electric motor 14, a voltage is applied from the battery pack 17 to rotate the motor shaft 46. The motor shaft 46 is connected to a rotating member 76 via a decelerator 75. The electric motor 14, the motor shaft 46, and the rotating member 76 are arranged concentrically around a center line A2. The center line A2 is arranged so as to intersect the center line A1.

The conversion mechanism 15 converts the rotational force of the rotating member 76 into the moving force of the striking unit 12 and the moving force of the weight 18. The conversion mechanism 15 has a first gear 50, a second gear 51, and a third gear 52. A cam roller 57 is provided on the first gear 50, a cam roller 58 is provided on the second gear 51, and a cam roller 59 is provided on the third gear 52.

When a voltage is applied from the battery pack 17 to the electric motor 14 and the motor shaft 46 rotates forward, the rotational force of the motor shaft 46 is transmitted to the first gear 50 via a decelerator 47. The rotational force of the first gear 50 is transmitted to the third gear 52 via the second gear 51.

A first engaging portion 77 is provided on the plunger 26. The cam rollers 57 and 58 can be engaged with and released from the first engaging portion 77. A second engaging portion 78 is provided on the weight 18. The cam roller 59 can be engaged with and released from the second engaging portion 78.

The magazine 13 has a main body 80 and a guide portion 81, and the main body 80 is fixed to the housing 11 and the ejection unit 23. The push lever switch 73 is attached to the main body 80. The guide portion 81 can move and stop with respect to the main body 80 in the direction along the center line A2. A lock lever 107 is provided on the guide portion 81. When a user operates the lock lever 107, the guide portion 81 becomes movable with respect to the main body 80. The guide portion 81 has the magazine plate 105, and when the guide portion 81 is positioned to the main body 80, the magazine plate 105 comes into contact with the blade guide 120. A storage chamber is formed between the main body 80 and the guide portion 81. The storage chamber can store a plurality of fasteners 25 in a state of being arranged in a row. The adjacent fasteners 25 are connected by an adhesive.

A feeder 70 is provided in the magazine 13. The feeder 70 is biased by a biasing force of a metal spring 71 in a fifth direction B1 toward the ejection unit 23. The fifth direction B1 is a direction along the center line A2. The feeder 70 sends the fastener 25 stored in the magazine 13 to the ejection path 24. The fastener 25 moves along the guide portion 81. A contact member 114 is attached to the magazine 13. The contact member 114 can be defined as a base. The contact member 114 is arranged at a distance from the ejection unit 23 in the sending direction of the fastener 25.

Next, an example of using the driving tool 10 will be described. The control unit 16 controls such that electric power is not supplied to the electric motor 14 when at least one of the trigger switch 43 and the push lever switch 73 is off. The striking unit 12 is stopped at a standby position. Here, an example in which the plunger 26 is separated from the plunger bumper 38 when the striking unit 12 is stopped at the standby position will be described.

When a user applies an operation force to the trigger 42, the trigger switch 43 is turned on, and when the first push lever 74 is pressed to the workpiece W1, the push lever switch 73 is turned on. Then, the control unit 16 applies a voltage to the electric motor 14 to rotate the motor shaft 46. The rotational force of the motor shaft 46 is amplified by the decelerator 75 and transmitted to the first gear 50, and the first gear 50, the second gear 51, and the third gear 52 rotate.

When at least one of the cam rollers 57 and 58 engages with the first engaging portion 77, the striking unit 12 moves upward from the standby position. Further, when the cam roller 59 of the third gear 52 engages with the second engaging portion 78, the weight 18 moves downward.

Next, when both the cam rollers 57 and 58 are released from the first engaging portion 77, the striking unit 12 moves downward by the biasing force of the spring 36. Further, when the cam roller 59 is released from the second engaging portion 78, the weight 18 moves upward by the biasing force of the spring 36. The driver blade 27 strikes one fastener 25 that has reached the ejection path 24 from the magazine 13, and the fastener 25 is driven into the workpiece W1.

After the driver blade 27 strikes the fastener 25, the plunger 26 collides with the plunger bumper 38. The plunger bumper 38 absorbs a part of the kinetic energy of the striking unit 12. Further, the weight 18 collides with the weight bumper 37. The weight bumper 37 absorbs a part of the kinetic energy of the weight 18. As described above, when the striking unit 12 moves in the first direction D1 and strikes the fastener 25, the weight 18 can reduce the recoil when the striking unit 12 strikes the fastener 25.

The control unit 16 rotates the electric motor 14 even after the user separates the first push lever 74 from the workpiece W1 and the trigger switch 43 is turned off, after the fastener 25 is driven into the workpiece W1. Then, the striking unit 12 moves upward from the bottom dead center against the biasing force of the spring 36, and the plunger 26 is separated from the plunger bumper 38. When the control unit 16 detects that the striking unit 12 has reached the standby position, the control unit 16 stops the electric motor 14.

The user can press the first push lever 74 to the workpiece W1 and bring the contact member 114 into contact with the workpiece W1. Namely, the first push lever 74 and the contact member 114 come into contact with the workpiece W1 at two locations spaced apart in the sending direction of the fastener 25. Note that the user can also use the driving tool 10 in the state where the contact member 114 is detached from the magazine 13.

Figure 5:
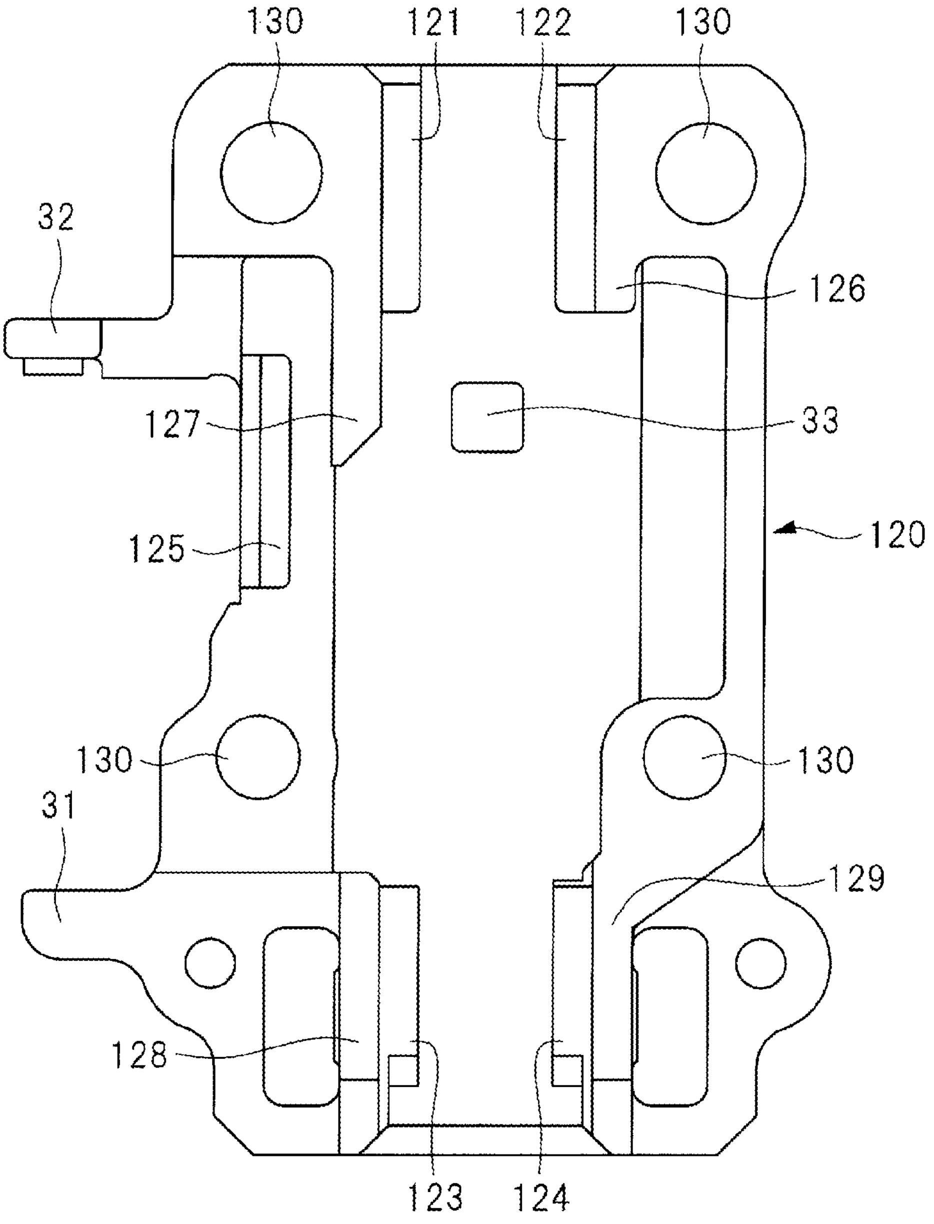
FIG. 5 is a front view of a blade guide showing the specific example 1 of the positioning mechanism.
Figure 6:
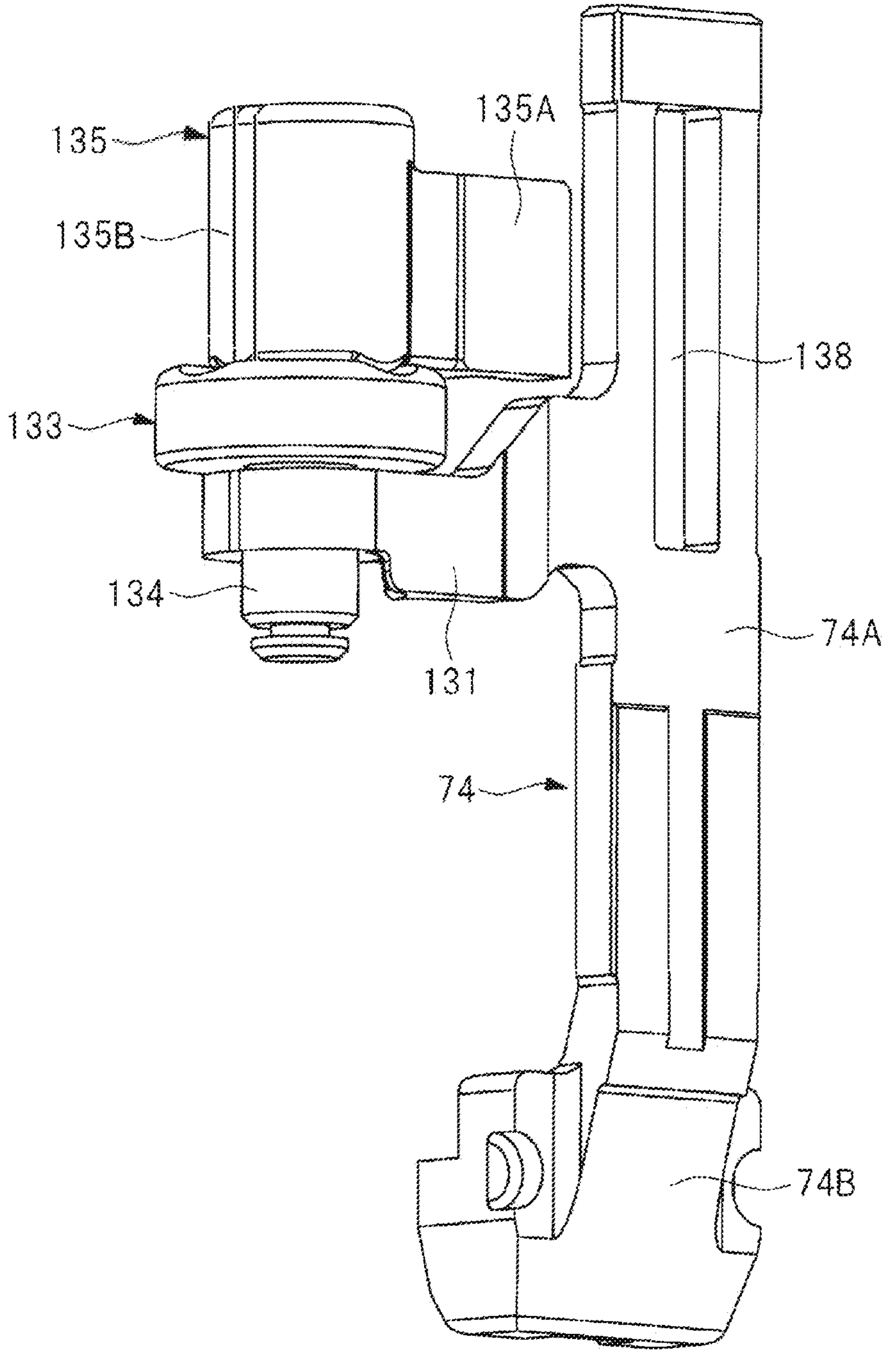
FIG. 6 is a perspective view of a push lever provided in the driving tool.
Figure 7:
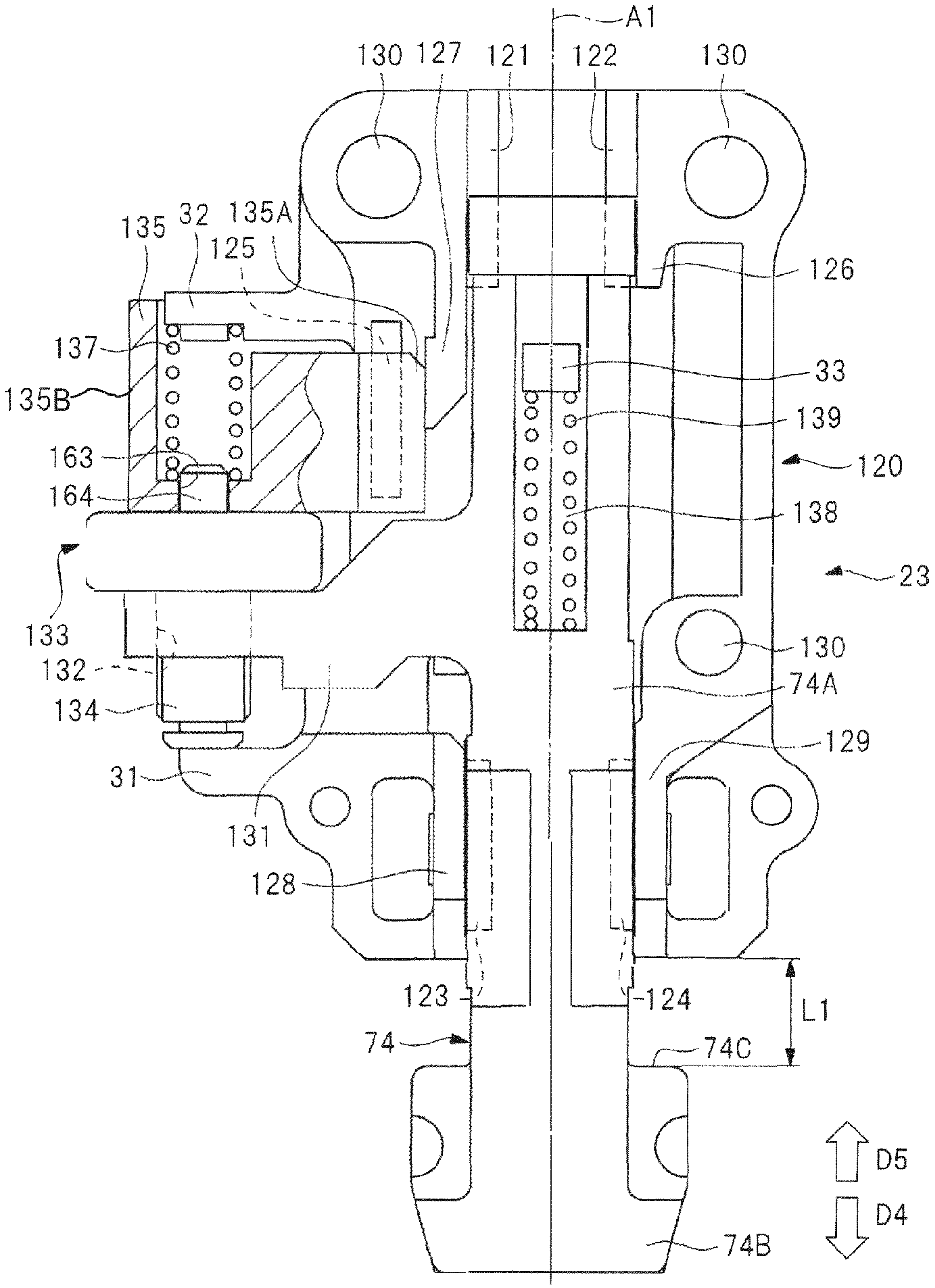
FIG. 7 is a front view of the ejection unit including the specific example 1 of the positioning mechanism.

The ejection unit 23 in this embodiment has the following configuration. As shown in FIG. 5, FIG. 6, and FIG. 7, the blade guide 120 has a stopper 31, protrusions 32 and 33, and guide portions 121, 122, 123, 124, 125, 126, 127, 128, and 129. In the direction along the center line A1, the guide portions 121 and 122 are arranged in the same range and the guide portions 123 and 124 are arranged in the same range. The guide portions 121 and 122 and the guide portions 123 and 124 are arranged at intervals in the direction along the center line A1. The guide portions 121, 122, 123, 124, and 125 are flat surfaces and are located on the same plane.

The guide portions 126 and 127 and the guide portions 128 and 129 are arranged at intervals in the direction along the center line A1. The guide portion 126 and the guide portion 127 are arranged so as to be separated across the center line A1. The guide portion 128 and the guide portion 129 are arranged so as to be separated across the center line A1.

Further, a plurality of mounting holes 130 are provided in the blade guide 120. Screw members 136 shown in FIG. 2 and FIG. 3 are arranged in the mounting holes 130, respectively. The screw members 136 are tightened, so that the cover 30 and the blade guide 120 are fixed to the main body 19. The first push lever 74 is arranged between the blade guide 120 and the cover 30 in the direction along the center line A2.

As shown in FIG. 6 and FIG. 7, the first push lever 74 has a plate-shaped main body 74A, an arm 131, and a head portion 74B. The arm 131 protrudes from the main body 74A in a direction intersecting the center line A1. The head portion 74B is connected to the main body 74A. The head portion 74B has an end portion 74C. The main body 74A of the first push lever 74 is arranged between the guide portion 126 and the guide portion 127, and is arranged between the guide portion 128 and the guide portion 129.

A shaft hole 132 is provided in the arm 131. A female screw is provided on an inner surface of the shaft hole 132. A guide hole 138 is provided in the first push lever 74. The protrusion 33 is located in the guide hole 138. When the first push lever 74 moves in the direction along the center line A1 with respect to the blade guide 120, the protrusion 33 moves in the guide hole 138. A spring 139 is arranged in the guide hole 138. The spring 139 is compressed in contact with the protrusion 33, and the spring 139 biases the first push lever 74 in a third direction D4 so as to separate it from the main body 19.

An adjuster 133 is arranged between the arm 131 and the protrusion 32. The adjuster 133 has a shaft portion 134. A male screw is provided on an outer surface of the shaft portion 134. The adjuster 133 is a cylindrical dial. The shaft portion 134 is arranged in the shaft hole 132. When the user rotates the adjuster 133, the adjuster 133 moves in the direction along the center line A1 with respect to the arm 131.

As shown in FIG. 7, the adjuster 133 has a pin 164. The second push lever 135 is arranged between the adjuster 133 and the protrusion 32. The second push lever 135 has a main body 135B, an arm 135A and a shaft hole 163. The arm 135A protrudes from the second push lever 135 in a direction intersecting the center line A1. Further, the pin 164 is arranged in the shaft hole 163. A spring 137 is provided between the protrusion 32 and the second push lever 135. The spring 137 is compressed in the direction along the center line A1, and the spring 137 presses the second push lever 135 to the adjuster 133. The second push lever 135 can move in the direction along the center line Al with respect to the blade guide 120. When the second push lever 135 moves, the push lever switch 73 is switched on and off.

The functions and operations of the first push lever 74, the second push lever 135, and the adjuster 133 are as follows. The first push lever 74 is biased by the force of the spring 139 in the third direction D4 in any of the cases in which the head portion 74B is separated from the workpiece W1 and in which the head portion 74B is pressed to the workpiece W1.

Also, the second push lever 135 is biased by the force of the spring 137 in the third direction D4 and is in contact with the adjuster 133 in any of the cases in which the head portion 74B is separated from the workpiece W1 and in which the head portion 74B is pressed to the workpiece W1.

First, the case in which the head portion 74B of the first push lever 74 is separated from the workpiece W1 will be described. The force of the spring 139 is transmitted to the shaft portion 134 via the first push lever 74, and the shaft portion 134 is in contact with the stopper 31 as shown in FIG. 7. Namely, the first push lever 74 is stopped at the initial position. Further, the end portion 74C is separated from the blade guide 120. When the first push lever 74 is stopped at the initial position, the second push lever 135 is stopped at a position separated from the contact piece 73A, that is, at the initial position as shown in FIG. 3. Therefore, the push lever switch 73 is off.

Then, when the head portion 74B is pressed to the workpiece W1, the first push lever 74 moves in a forth direction D5 with respect to the ejection unit 23 against the force of the spring 139. Therefore, the shaft portion 134 is separated from the stopper 31. The fourth direction D5 is the direction along the center line A1 and is opposite to the third direction D4.

When the first push lever 74 moves in the fourth direction D5, the moving force of the first push lever 74 is transmitted to the second push lever 135 via the adjuster 133. Therefore, the second push lever 135 moves in the fourth direction D5 against the force of the spring 137. When the second push lever 135 comes into contact with the contact piece 73A and the contact piece 73A is actuated, the push lever switch 73 is switched from off to on. Then, the first push lever 74 stops when the end portion 74C comes into contact with the blade guide 120. Namely, the first push lever 74 stops at the actuated position. When the first push lever 74 stops at the actuated position, the second push lever 135 stops at the actuated position.

When the head portion 74B is separated from the workpiece W1 in the state where the first push lever 74 is stopped at the actuated position, the first push lever 74 moves from the actuated position in the third direction D4 by the force of the spring 139. Therefore, the end portion 74C is separated from the blade guide 120.

Further, when the first push lever 74 moves from the actuated position in the third direction D4, the second push lever 135 maintains the state of being in contact with the adjuster 133, and moves from the actuated position in the third direction D4 by the force of the spring 137. When the second push lever 135 is separated from the contact piece 73A, the push lever switch 73 is switched from on to off. When the shaft portion 134 comes into contact with the stopper 31, the first push lever 74 stops at the initial position. When the first push lever 74 is stopped at the initial position, the head portion 74B protrudes by a length L1 with respect to a tip 105A of the magazine plate 105. The length L1 is the length in the direction along the center line A1. Further, the second push lever 135 stops at the initial position.

When the user rotates the adjuster 133 in the state where the head portion 74B is separated from the workpiece W1, the first push lever 74 moves in the direction along the center line A1 with respect to the ejection unit 23 in the state where the arm 131 and the shaft portion 134 are connected to each other. When the user switches the direction in which the adjuster 133 is rotated, the direction in which the first push lever 74 moves is switched between the third direction D4 and the fourth direction D5. Namely, when the user rotates the adjuster 133, the length L1 can be adjusted.

Further, the amount of movement of the first push lever 74 from the initial position to the actuated position is determined in accordance with the length L1. As the length L1 increases, the amount of movement of the first push lever 74 from the initial position to the actuated position increases. Therefore, the user can adjust the position of the head portion 74B of the first push lever 74 with respect to the tip 105A of the magazine plate 105 in the direction along the center line A1 by rotating the adjuster 133.

Further, in the state where the striking unit 12 reaches the bottom dead center, the tip of the driver blade 27 is located at the tip 105A of the magazine plate 105. Namely, the user can adjust the driving amount of the fastener 25 into the workpiece W1 by adjusting the length L1 at which the head portion 74B protrudes from the tip 105A.

The driving tool 10 includes a positioning mechanism. The positioning mechanism functions to set the movement of the first push lever 74 and the second push lever 135 with respect to the ejection unit 23 in a predetermined direction. FIG. 4(B) is a three-dimensional coordinate system showing an example in which the movement of the first push lever 74 and the second push lever 135 with respect to the ejection unit 23 is set in a predetermined direction. FIG. 4(B) shows a first plane 160, a second plane 161, a first axis Z1, a second axis Y1, and a third axis X1. The first plane 160 is perpendicular to the second plane 161. The third axis X1 corresponds to the center line A1, and the first axis Z1 corresponds to the center line A2. The second axis Y1 is an axis corresponding to the left-right direction in FIG. 2 and FIG. 7. The first axis Z1 is located along the first plane 160, and the second axis Y1 is located along the second plane 161. The third axis X1 passes through an intersection of the first plane 160 and the second plane 161.

The coordinate system shown in FIG. 4(B) is an example in which the angle formed between the first axis Z1 and the third axis X1 in the first plane 160 is 90 degrees. The coordinate system shown in FIG. 4(B) is an example in which the angle formed between the second axis Y1 and the third axis X1 in the second plane 161 is 90 degrees.

The present embodiment discloses the specific example 1, the specific example 2, and the specific example 3 of the positioning mechanism.

(Specific Example 1)

By contacting with the guide portions 121, 122, 123, and 124 and the cover 30, respectively, the first push lever 74 is restricted from moving in the direction intersecting the third axis X1 in the first plane 160. By contacting with the guide portions 126, 127, 128, and 129, respectively, the first push lever 74 is restricted from moving in the direction intersecting the third axis X1 in the second plane 161.

Further, by contacting the arm 135A with the guide portion 125 and the cover 30, the second push lever 135 is restricted from moving in the direction intersecting the third axis X1 in the first plane 160. By contacting the arm 135A with the guide portion 127, the second push lever 135 is restricted from moving in the direction intersecting the third axis X1 in the second plane 161.

Namely, the blade guide 120 and the cover 30 both have a function as a member for positioning the first push lever 74 and the second push lever 135 with respect to the ejection unit 23. Therefore, it is not necessary to separately provide the positioning member of the first push lever 74 and the positioning member of the second push lever 135. Accordingly, it is possible to suppress the increase in the number of components of the driving tool 10 and reduce the size, weight, and cost of the driving tool 10.

Further, the first push lever 74 and the second push lever 135 are both positioned such that the moving directions thereof are along the third axis X1. Therefore, it is possible to prevent the moving force of one element from acting as a moment that rotates the other element with a predetermined position as a fulcrum. Accordingly, it is possible to suppress the increase in the actuation of the first push lever 74 and the actuation resistance of the second push lever 135, respectively. Further, it is possible to suppress the increase in the contact resistance between the adjuster 133 and the second push lever 135, and it is possible to suppress the decrease in the operability of the adjuster 133.

Also, the guide portions 121, 122, 123, 124, and 125 are located on the same plane. Therefore, it is possible to reduce the sliding resistance in the case where the first push lever 74 and the second push lever 135 move in the direction along the third axis X1.

The guide portions 126 and 127 and the guide portions 128 and 129 position the first push lever 74 by coming into contact with it in the two ranges spaced apart in the direction along the third axis X1. Therefore, it is possible to reliably prevent the first push lever 74 from moving in the direction intersecting the third axis X1 in the second plane 161.

(Specific Example 2)

Figure 8:
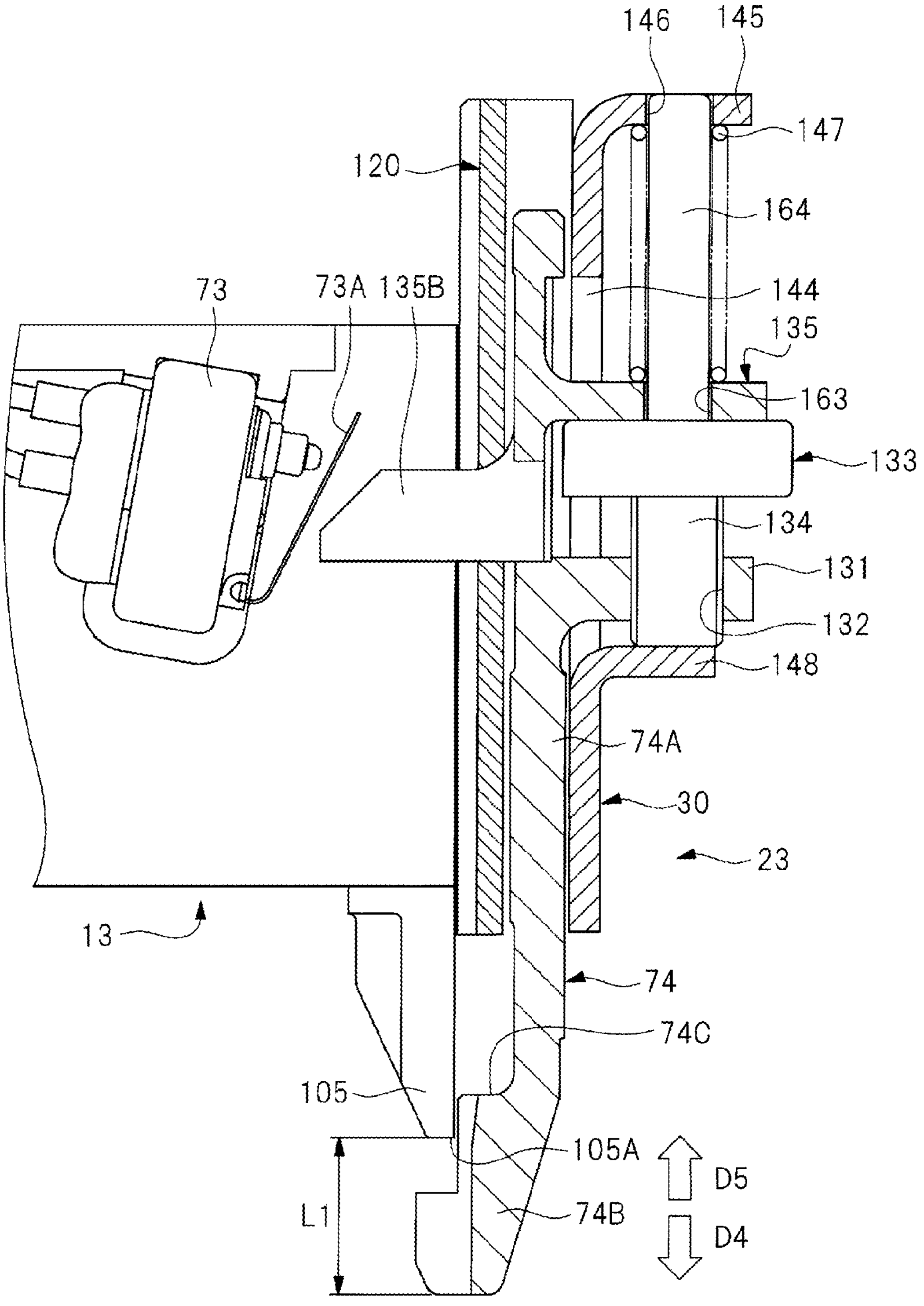
FIG. 8 is a side cross-sectional view of an ejection unit including a specific example 2 of a positioning mechanism.
Figure 9:
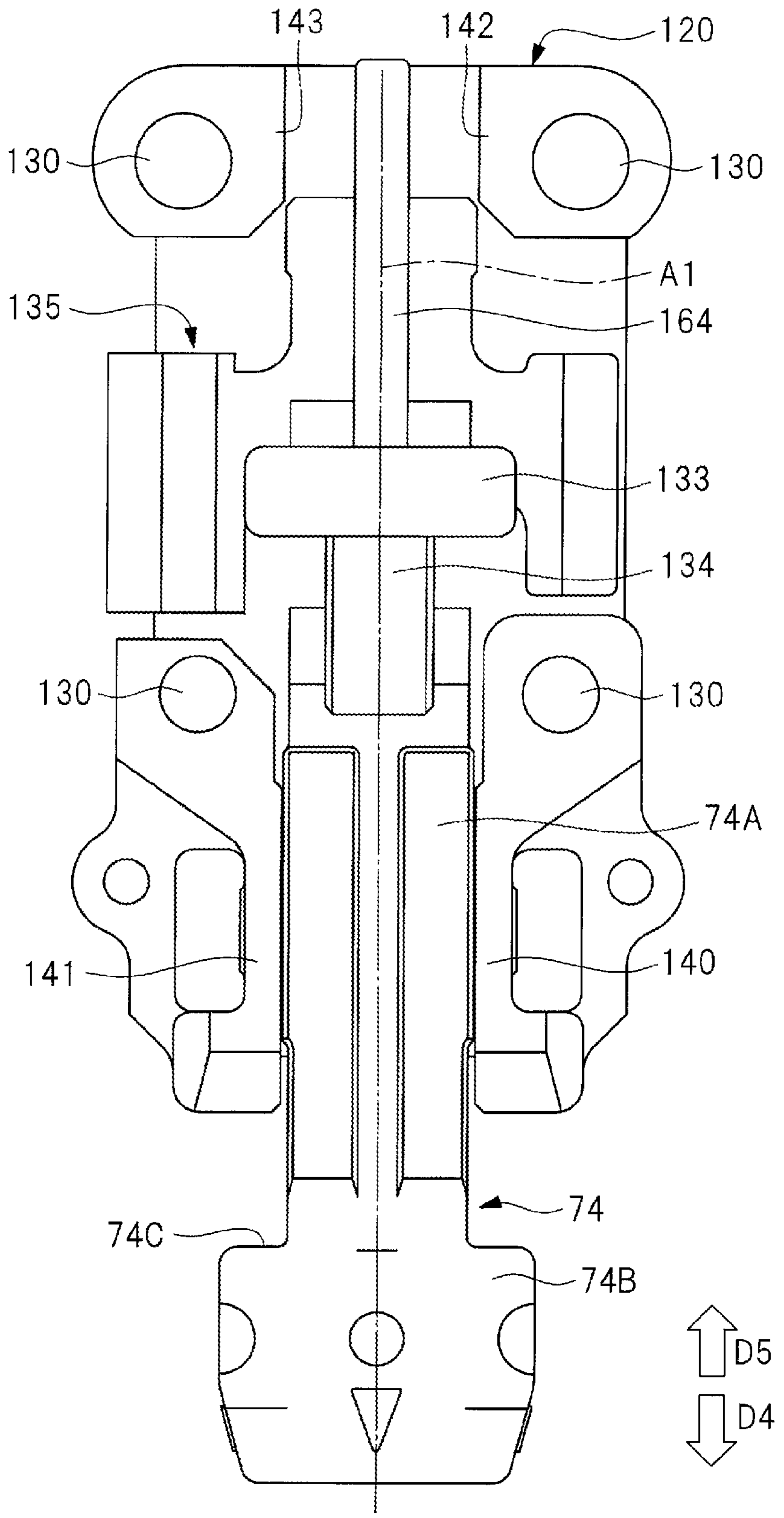
FIG. 9 is a front view of a blade guide and a push lever showing the specific example 2 of the positioning mechanism.
Figure 10:
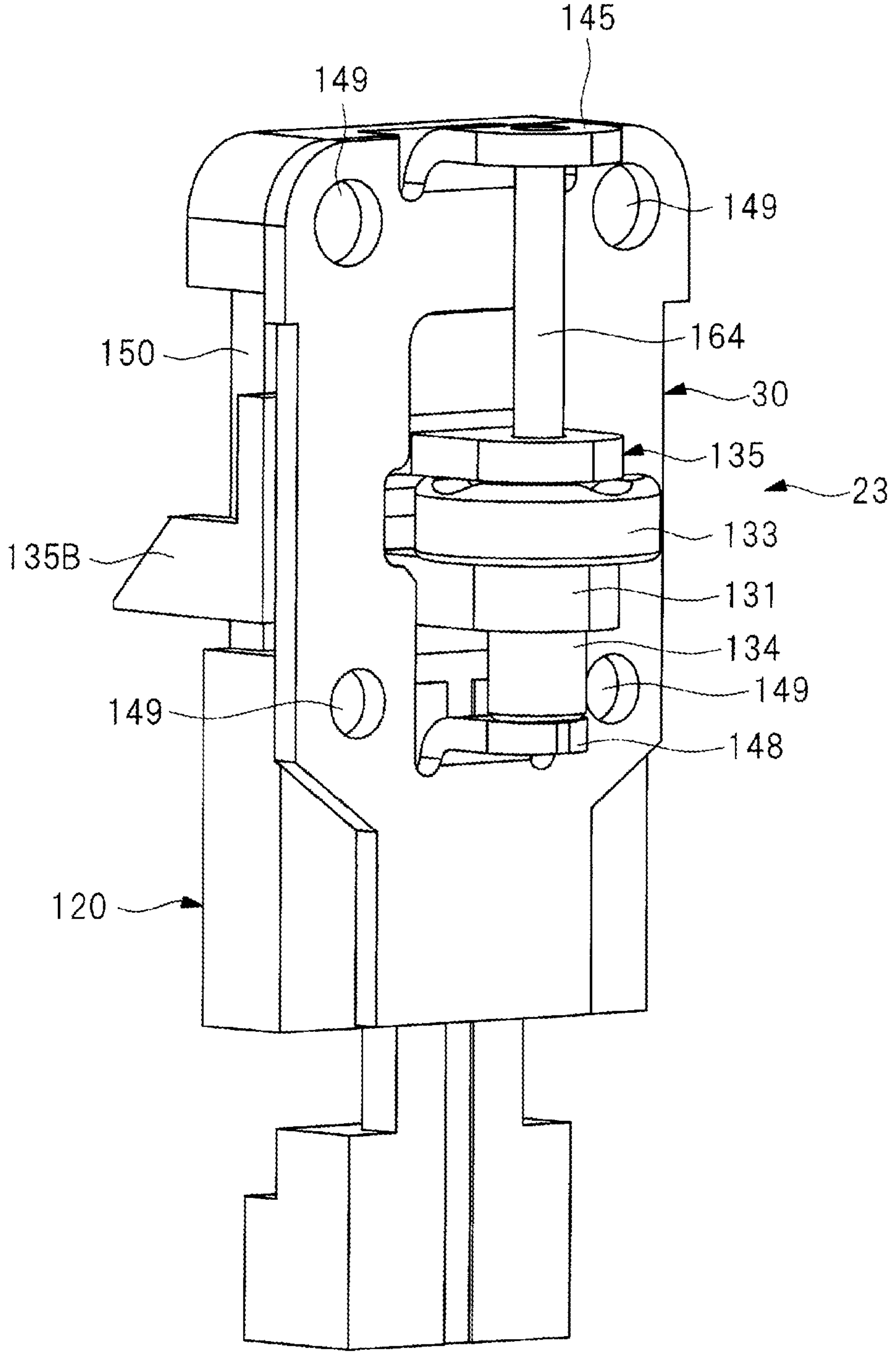
FIG. 10 is a perspective view of the ejection unit including the specific example 2 of the positioning mechanism.

The specific example 2 of the positioning mechanism is shown in FIG. 8, FIG. 9, and FIG. 10. The blade guide 120 has guide portions 140, 141, 142, and 143. The guide portions 140 and 141 are provided in the same range in the direction along the center line A1. The guide portions 142 and 143 are provided in the same range in the direction along the center line A1. The arrangement range of the guide portions 140 and 141 and the arrangement range of the guide portions 142 and 143 are different.

The first push lever 74 is arranged between the magazine 13 and the cover 30 in the direction along the center line A2. By contacting with the blade guide 120 and the cover 30, respectively, the first push lever 74 and the second push lever 135 are positioned in the direction along the first axis Z1. The first axis Z1 corresponds to the left-right direction in FIG. 8. By contacting the guide portions 140 and 141 with the main body 74A of the first push lever 74, the first push lever 74 is positioned in the direction along the second axis Y1. The second axis Y1 corresponds to the left-right direction in FIG. 9. By contacting the guide portions 142 and 143 with the second push lever 135, the second push lever 135 is positioned in the direction along the second axis Y1.

The cover 30 has an opening 144, a stopper 148, and mounting holes 149. Screw members are inserted and tightened into the mounting holes 149 and 130, so that the cover 30 and the blade guide 120 are fixed to the main body 19 in FIG. 1.

A part of the second push lever 135 and a part of the arm 131 are arranged in the opening 144. A protrusion 145 is provided on the cover 30, and the protrusion 145 has a shaft hole 146. A pin 164 is arranged in shaft holes 163 and 146. A spring 147 is arranged between the protrusion 145 and the second push lever 135. The spring 147 biases the second push lever 135 in the third direction D4, and the second push lever 135 comes into contact with the adjuster 133 and stops. The force of the spring 147 is transmitted to the arm 131 via the second push lever 135 and the adjuster 133, and the first push lever 74 is always biased in the third direction D4.

The functions and operations of the first push lever 74, the second push lever 135, and the adjuster 133 in the specific example 2 are as follows. The second push lever 135 is biased in the third direction D4 by the force of the spring 147 and is in contact with the adjuster 133 in any of the cases in which the head portion 74B is separated from the workpiece W1 and in which the head portion 74B is pressed to the workpiece W1.

First, the case where the head portion 74B of the first push lever 74 is separated from the workpiece W1 will be described. The force of the spring 147 is transmitted to the shaft portion 134 via the second push lever 135 and the adjuster 133, and the shaft portion 134 is in contact with the stopper 148 as shown in FIG. 8. Namely, the first push lever 74 is stopped at the initial position. Further, the end portion 74C is separated from the blade guide 120. When the first push lever 74 is stopped at the initial position, the second push lever 135 is stopped at the position separated from the contact piece 73A, that is, at the initial position as shown in FIG. 8. Therefore, the push lever switch 73 is off.

Then, when the head portion 74B is pressed to the workpiece W1, the first push lever 74 moves in the fourth direction D5 with respect to the ejection unit 23 against the force of the spring 147. Therefore, the shaft portion 134 is separated from the stopper 148.

When the first push lever 74 moves in the fourth direction D5, the moving force of the first push lever 74 is transmitted to the second push lever 135 via the adjuster 133. Therefore, the second push lever 135 moves in the fourth direction D5 against the force of the spring 137. When the second push lever 135 comes into contact with the contact piece 73A and the contact piece 73A is actuated, the push lever switch 73 is switched from off to on. Then, the first push lever 74 stops when the end portion 74C comes into contact with the blade guide 120. Namely, the first push lever 74 stops at the actuated position. When the first push lever 74 stops at the actuated position, the second push lever 135 stops at the actuated position.

When the head portion 74B is separated from the workpiece W1 in the state where the first push lever 74 is stopped at the actuated position, the first push lever 74 moves from the actuated position in the third direction D4 by the force of the spring 147. Therefore, the end portion 74C is separated from the blade guide 120.

Further, when the first push lever 74 moves from the actuated position in the third direction D4, the second push lever 135 maintains the state of being in contact with the adjuster 133, and moves from the actuated position in the third direction D4 by the force of the spring 147. When the second push lever 135 is separated from the contact piece 73A, the push lever switch 73 is switched from on to off. When the shaft portion 134 comes into contact with the stopper 148, the first push lever 74 stops at the initial position. Also, the second push lever 135 stops at the initial position. When the user rotates the adjuster 133 in the state where the head portion 74B is separated from the workpiece W1, the length L1 at which the head portion 74B protrudes from the tip 105A can be adjusted.

As shown in FIG. 10, the blade guide 120 has a cutout portion 150, and a portion 135B of the second push lever 135 that comes into contact with and separates from the contact piece 73A moves in the cutout portion 150, and thus the movement of the second push lever 135 is not hindered.

The blade guide 120 and the cover 30 restrict the first push lever 74 and the second push lever 135 from moving in the direction intersecting the third axis X1 in the first plane 160. Therefore, it is not necessary to separately provide the member that positions the first push lever 74 in the direction intersecting the third axis X1 in the first plane 160 and the member that positions the second push lever 135 in the direction intersecting the third axis X1 in the first plane 160. Accordingly, it is possible to reduce the number of components, the size, and the weight of the driving tool 10.

The blade guide 120 and the cover 30 prevent the first push lever 74 and the second push lever 135 from moving in the direction intersecting the third axis X1 in the first plane 160. Further, the guide portions 140 and 141 that position the first push lever 74 and the guide portions 142 and 143 that position the second push lever 135 are provided on physically the same component, that is, the blade guide 120 which is a single component. Therefore, it is not necessary to separately provide the members for preventing the first push lever 74 and the second push lever 135 from moving in the direction intersecting the third axis X1 in the second plane 161. Accordingly, it is possible to reduce the number of components, the size, and the weight of the driving tool 10.

Also, as for the configuration in the specific example 2 of the positioning mechanism which is the same as that in the specific example 1 of the positioning mechanism, the same effect as that of the specific example 1 of the positioning mechanism can be obtained.

(Specific Example 3)

Figure 11:
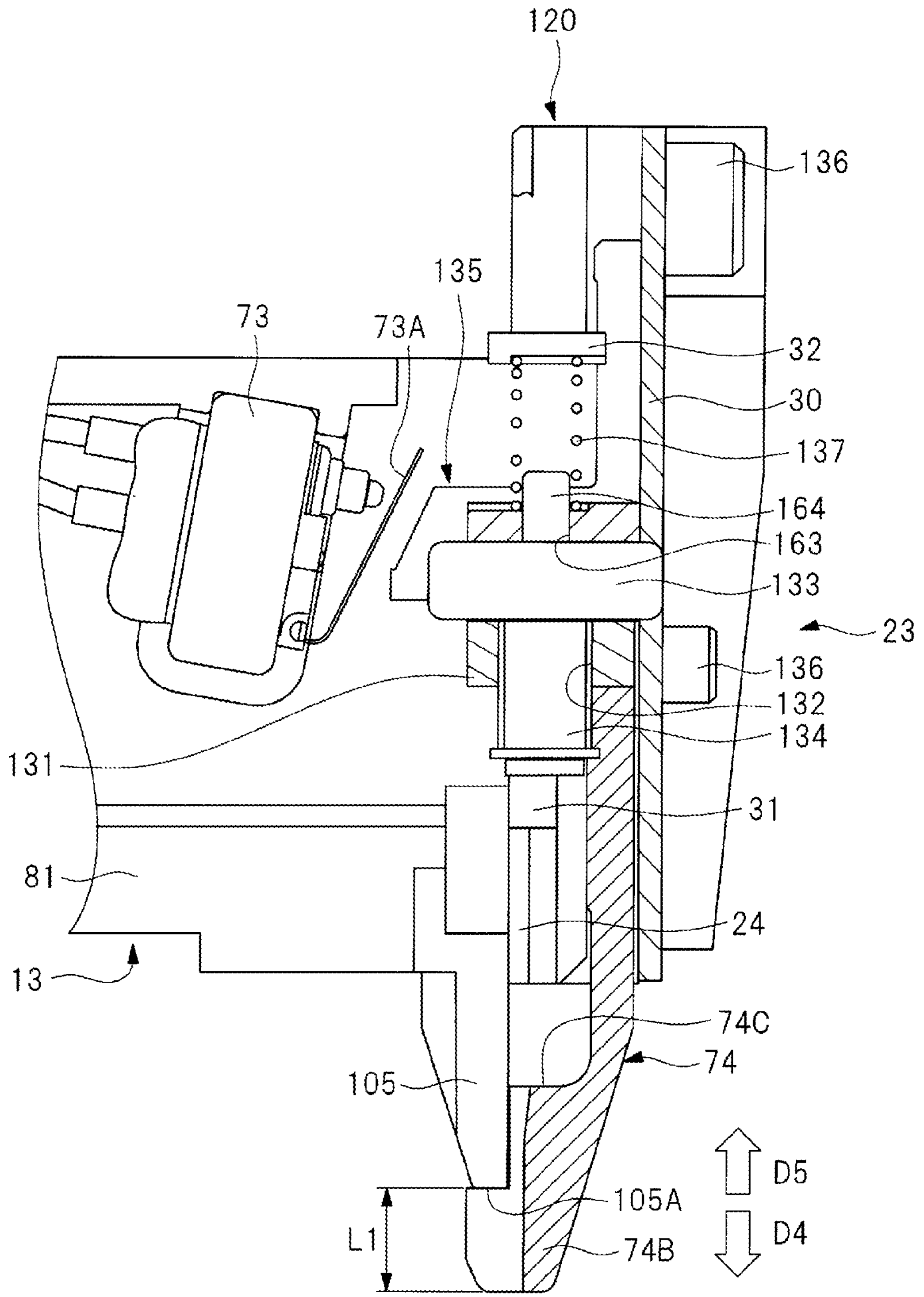
FIG. 11 is a side cross-sectional view of an ejection unit including a specific example 3 of a positioning mechanism.
Figure 12:
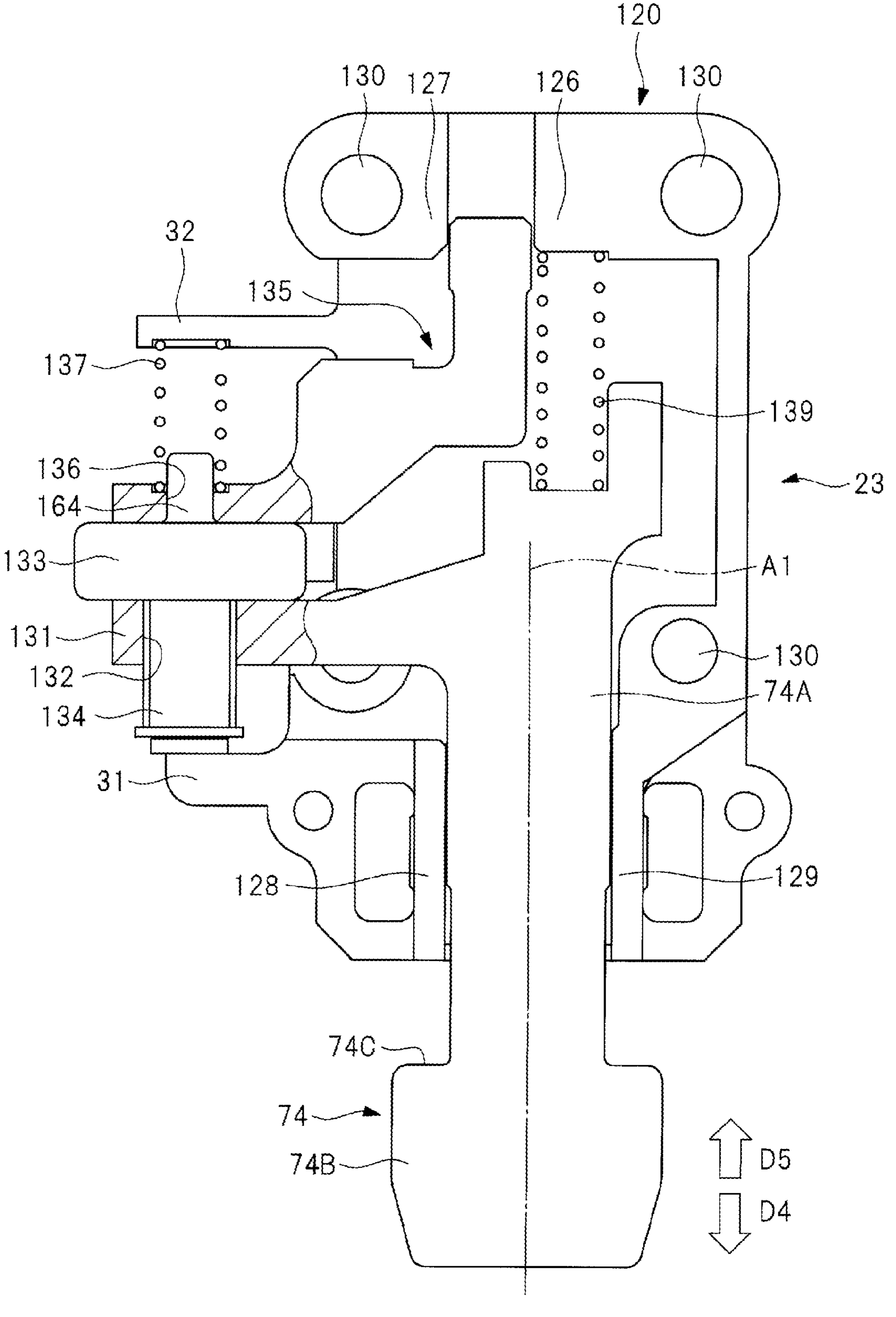
FIG. 12 is a front view of a blade guide and a push lever showing the specific example 3 of the positioning mechanism.
Figure 13:
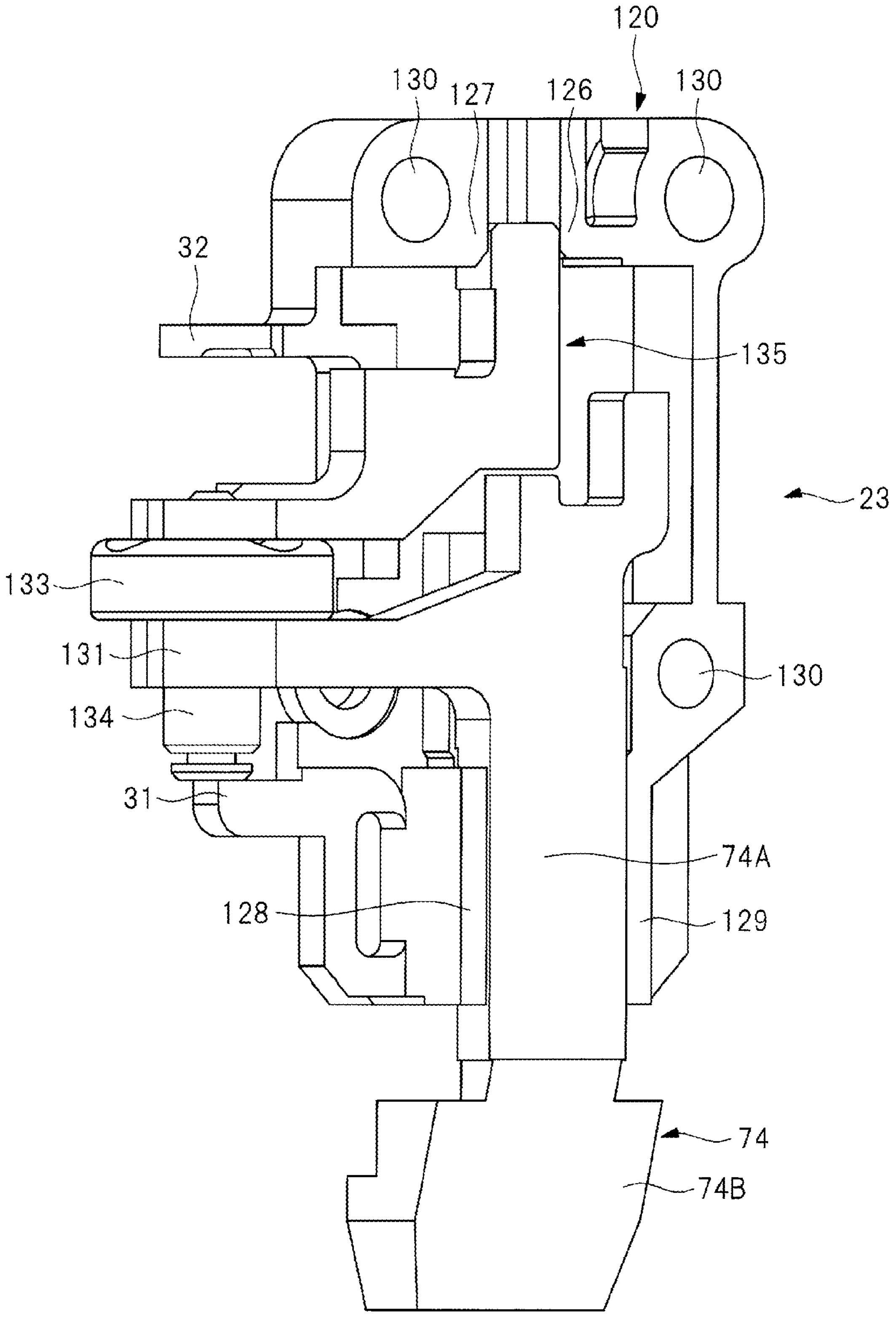
FIG. 13 is a perspective view of the ejection unit including the specific example 3 of the positioning mechanism.

The specific example 3 of the positioning mechanism is shown in FIG. 11, FIG. 12, and FIG. 13. The specific example 3 has substantially the same configuration as the specific example 1. The guide portions 126 and 127 are in contact with the second push lever 135. The guide portions 126 and 127 are separated from the first push lever 74. The guide portions 128 and 129 are in contact with the first push lever 74. The blade guide 120 and the cover 30 position the first push lever 74 and the second push lever 135 in the direction along the center line A2 in FIG. 1. The spring 139 is arranged between the guide portion 126 and the first push lever 74, and the spring 139 biases the first push lever 74 in the third direction D4.

By contacting with the blade guide 120 and the cover 30, respectively, the first push lever 74 is restricted from moving in the direction intersecting the third axis X1 in the first plane 160. By contacting with the guide portions 128 and 129, respectively, the first push lever 74 is restricted from moving in the direction intersecting the third axis X1 in the second plane 161.

Also, by contacting with the blade guide 120 and the cover 30, the second push lever 135 is restricted from moving in the direction intersecting the third axis X1 in the first plane 160. By contacting with the guide portions 127 and 128, the second push lever 135 is restricted from moving in the direction intersecting the third axis X1 in the second plane 161.

Note that the moving directions of the first push lever 74 and the second push lever 135 are restricted, respectively. On the other hand, there is a gap between the components due to the dimensional error of the components, the processing tolerance of the components, and the like. Therefore, the movement of the first push lever 74 and the second push lever 135 in the original moving direction are not hindered, and they can move smoothly.

Namely, the blade guide 120 and the cover 30 both function as the positioning members of the first push lever 74 and the second push lever 135. In other words, there are shared components that position the first push lever 74 and the second push lever 135. Therefore, it is not necessary to separately provide the positioning member of the first push lever 74 and the positioning member of the second push lever 135. Accordingly, it is possible to suppress the increase in the number of components of the driving tool 10 and reduce the size, the weight, and the cost of the driving tool 10. The other effects in the specific example 3 are the same as those in the specific example 1.

Examples of the technical meaning of the matters disclosed in the embodiment are as follows. The driving tool 10 is an example of a driving tool. The fastener 25 is an example of a fastener, and the magazine 13 is an example of a magazine. The ejection unit 23 is an example of an ejection unit. The striking unit 12 is an example of a striking unit. The first push lever 74 is an example of a first push lever. The second push lever 135 is an example of a second push lever. The blade guide 120 and the cover 30 are an example of a guide member.

The guide member has a function to set the moving directions of the first push lever and the second push lever to a predetermined direction. Therefore, the guide member may be singular or plural. For example, the guide hole can be formed in each of the first push lever and the second push lever described in the embodiment. Then, by providing the blade guide 120 with the pins to be arranged in the guide holes, the single blade guide 120 has a function to set the moving directions of the first push lever and the second push lever to a predetermined direction. The blade guide 120 is an example of a blade guide. The cover 30 is an example of a cover. The adjuster 133 is an example of an adjustment mechanism.

The direction along the center line A1, that is, the direction along the third axis X1 is an example of a moving direction of a striking unit and a predetermined direction. The first direction D1 is an example of a first direction. The second direction D2 is an example of a second direction. The length L1 is an example of the amount of protrusion of the first push lever with respect to the ejection unit in the first direction. The direction along the center line A2 is an example of a direction in which the fastener is supplied to the ejection unit. The spring 36 is an example of a spring. The electric motor 14 is an example of a motor. The push lever switch 73 and the control unit 16 are an example of a detection unit. The control unit 16 is an example of a control unit. The magazine plate 105 is an example of a magazine plate. The ejection path 24 is an example of an ejection path. The guide portions 121, 122, 123, and 124 are an example of a first guide portion. The guide portion 125 is an example of a second guide portion. The second push lever capable of moving in conjunction with the first push lever includes the meaning of the second push lever capable of moving by the transmission of the moving force of the first push lever.

The driving tool is not limited to the embodiment disclosed with reference to the drawings, and various changes can be made within the range not departing from the gist thereof. For example, the shapes of the first push lever and the second push lever may be any of a shaft shape, a block shape, an arm shape, and the like, respectively. Also, the first push lever and the second push lever are only required to be movable with respect to the ejection unit in the same predetermined direction as the moving direction of the striking unit. It does not matter if the first push lever and the second push lever may have a fulcrum or not when they move.

Further, as the spring for moving the striking unit in the first direction, a gas spring can be used instead of the metal spring. As the motor, any of a hydraulic motor, a pneumatic motor, and an engine can be used instead of the electric motor. The power supply unit that applies a voltage to the electric motor may be any of a DC power supply and an AC power supply.

The mechanism for biasing the striking unit in the first direction may be a pressure accumulation chamber and a pressure chamber provided in the housing instead of the spring. A compressible gas is supplied to the pressure accumulation chamber from the outside of the housing via an air hose. A valve for connecting and disconnecting the pressure accumulation chamber and the pressure chamber is provided. The pressure chamber is a space in which the compressible gas is supplied from the pressure accumulation chamber. The striking unit moves in the first direction by the pressure of the pressure chamber. When the second push lever is actuated by the moving force of the first push lever, the valve connects or disconnects the pressure accumulation chamber and the pressure chamber. Further, the standby position of the striking unit may be a position where the plunger is separated from the plunger bumper.

The detection unit may include a non-contact sensor instead of a contact sensor or a contact switch that generates a signal by contacting with or separating from the second push lever. The non-contact sensor generates a signal without contacting with the second push lever. Examples of the non-contact sensor include an optical sensor and a magnetic sensor. The control unit may be a single electric or electronic component or may be a unit including a plurality of electric components or a plurality of electronic components. Examples of the electric component or the electronic component include a processor, a control circuit, and a module.

Further, in the coordinate system of FIG. 4(B), the angle formed between the first plane 160 and the second plane 161 does not have to be 90 degrees. It is sufficient if the first plane 160 and the second plane 161 intersect. Also, the angle formed between the first axis Z1 and the third axis X1 in the first plane 160 does not have to be 90 degrees. It is sufficient if the first axis Z1 and the third axis X1 intersect in the first plane 160. Further, the angle formed between the second axis Y1 and the third axis X1 in the second plane 161 does not have to be 90 degrees. It is sufficient if the second axis Y1 and the third axis X1 intersect in the second plane 161.

REFERENCE SIGNS LIST

10 driving tool,
12 striking unit,
13 magazine,
14 electric motor,
16 control unit,
23 ejection unit,
24 ejection path,
25 fastener,
30 cover,
36 spring,
73 push lever switch,
74 first push lever,
105 magazine plate,
120 blade guide,
121, 122, 123, 124, 125, 127, 128, 129 guide portion,
133 adjuster,
135 second push lever,
A1, A2 center line,
D1 first direction,
D2 second direction,
L1 length,
X1 third axis

The invention claimed is:

1. A driving tool comprising:
an ejection unit to which a fastener is supplied;
a striking unit operable to move in a first direction to drive the fastener supplied to the ejection unit into a workpiece, and move in a second direction opposite the first direction;
a first push lever having a tip and provided in the ejection unit, wherein the first push lever is movably supported with respect to the ejection unit while the tip protrudes from the ejection unit, and wherein when the tip comes into contact with the workpiece, the first push lever moves in the second direction; and
a second push lever provided in the ejection unit and operable to move in conjunction with the first push lever,
wherein the ejection unit includes a blade guide and a cover fixed to the blade guide,
wherein the blade guide and the cover are arranged to face each other,
wherein the first push lever and the second push lever are arranged between the blade guide and the cover,
wherein when the first push lever moves in the second direction upon the tip of the first push lever coming into contact with the workpiece, the blade guide and the cover, while in contact with the first push lever and the second push lever, guide the first push lever and the second push lever to move along the second direction,
wherein the driving tool further comprises:
a magazine that is configured to supply the fastener to the ejection unit and has a magazine plate; and
an ejection path, in which the fastener driven by the striking unit passes, formed between the magazine plate and the blade guide,
wherein the blade guide has a first side and a second side opposite the first side,
wherein the magazine plate is fixed to the first side of the blade guide and the cover is fixed to the second side of the blade guide, and
wherein the magazine plate, the ejection path, the blade guide, the first and second push levers, and cover are arranged in that order in a direction crossing the moving direction of the striking unit.

2. The driving tool according to claim 1, further comprising an adjustment mechanism configured to adjust an amount of protrusion of the first push lever from the ejection unit.

3. The driving tool according to claim 2,
wherein the cover positions the adjustment mechanism with respect to the ejection unit.

4. The driving tool according to claim 3, further comprising:
a magazine configured to supply the fastener to the ejection unit,
wherein a direction in which the fastener is supplied to the ejection unit is a direction intersecting the moving direction of the striking unit, and wherein the first push lever is arranged between the magazine and the adjustment mechanism in the direction in which the fastener is supplied to the ejection unit.

5. The driving tool according to claim 1, further comprising:

a biasing mechanism configured to move the striking unit in a first direction to strike the fastener; and a motor configured to move the striking unit in a second direction opposite to the first direction.

6. The driving tool according to claim 5, further comprising:

a detection unit configured to detect that the second push lever moves in the second direction; and a control unit configured to move the striking unit in the second direction by the motor when the detection unit has detected that the second push lever has moved in the second direction.

7. The driving tool according to claim 1, wherein the blade guide has a first guide portion and a second guide portion, wherein the first push lever is guided by contacting with the first guide portion, and wherein the second push lever is guided by contacting with the second guide portion.

8. The driving tool according to claim 1, wherein the second push lever is moved by a moving force transmitted from the first push lever.

9. A driving tool comprising:

an ejection unit to which a fastener is supplied;

a striking unit operable to move in a first direction to drive the fastener supplied to the ejection unit into a workpiece, and move in a second direction opposite the first direction;

a first push lever provided in the ejection unit, a first push lever having a tip and provided in the ejection unit, wherein the first push lever is movably supported with respect to the ejection unit while the tip protrudes from the ejection unit, and wherein when the tip comes into contact with the workpiece, the first push lever moves in the second direction;

a second push lever provided in the ejection unit and operable to move in conjunction with the first push lever;

a guide portion configured to guide a movement of the first push lever and the second push lever in a predetermined direction;

a biasing mechanism configured to move the striking unit in a first direction to strike the fastener;

a motor configured to move the striking unit in a second direction opposite to the first direction;

a detection unit configured to detect the movement of the second push lever in the second direction; and a control unit configured to move the striking unit in the second direction by the motor when the detection unit has detected the movement of the second push lever in the second direction, wherein the ejection unit includes a blade guide and a cover fixed to the blade guide, wherein the blade guide and the cover are arranged to face each other, wherein the guide portion comprises the blade guide and the cover, wherein the first push lever and the second push lever are arranged between the blade guide and the cover, wherein when the first push lever moves in the second direction upon the tip of the first push lever coming into contact with the workpiece, the blade guide and the cover, while in contact with the first push lever and the second push lever, guide the first push lever and the second push lever to move along the second direction, wherein the driving tool further comprises:

a magazine that is configured to supply the fastener to the ejection unit and has a magazine plate; and an ejection path, in which the fastener driven by the striking unit passes, formed between the magazine plate and the blade guide, wherein the blade guide has a first side and a second side opposite the first side, wherein the magazine plate is fixed to the first side of the blade guide and the cover is fixed to the second side of the blade guide, and wherein the magazine plate, the ejection path, the blade guide, the first and second push levers, and cover are arranged in that order in a direction crossing the moving direction of the striking unit.

10. A driving tool comprising:

an ejection unit to which a fastener is supplied;

a striking unit operable to move to drive the fastener supplied to the ejection unit into a workpiece;

a first push lever having a tip and provided in the ejection unit, wherein the first push lever is movably supported with respect to the ejection unit while the tip protrudes from the ejection unit, and wherein when the tip comes into contact with the workpiece, the first push lever moves in a direction opposite a moving direction of the striking unit;

a second push lever provided in the ejection unit and operable to move in conjunction with the first push lever; and an adjustment mechanism configured to adjust a position of the first push lever relative to the second push lever in the moving direction of the striking unit, wherein the ejection unit has a first guide portion and a second guide portion, wherein the first push lever includes a first body that is in contact with the first guide portion, and a first arm extending from the first body in a direction crossing the moving direction of the striking unit, wherein the second push lever includes a second body and a second arm which extends from the second body in the direction crossing the moving direction of the striking unit and is in contact with the second guide portion, wherein the adjustment mechanism is coupled between the first arm of the first push lever and the second body of the second push lever such that a moving force, generated when the first push lever moves in the direction opposite the moving direction of the striking unit upon the tip of the first push lever coming into contact with the workpiece, is transferred to the second body of the second push lever from the first body of the first push lever through the first arm, wherein when the first push lever moves in the direction opposite the moving direction upon the tip of the first push lever coming into contact with the workpiece, the first guide portion and the second guide portion, while in contact with the first body of the first push lever and the second arm of the second push lever, respectively, guide the first push lever and the second push lever to move along the direction opposite the moving direction, wherein the ejection unit includes a blade guide and a cover fixed to the blade guide, wherein the blade guide and the cover are arranged to face each other, wherein the guide portion comprises the blade guide and the cover, wherein the first push lever and the second push lever are arranged between the blade guide and the cover, wherein when the first push lever moves in the direction opposite the moving direction upon the tip of the first push lever coming into contact with the workpiece, the blade guide and the cover, while in contact with the first push lever and the second push lever, guide the first push lever and the second push lever to move along the direction opposite the moving direction, wherein the driving tool further comprises:

a magazine that is configured to supply the fastener to the ejection unit and has a magazine plate; and an ejection path, in which the fastener driven by the striking unit passes, formed between the magazine plate and the blade guide, wherein the blade guide has a first side and a second side opposite the first side, wherein the magazine plate is fixed to the first side of the blade guide and the cover is fixed to the second side of the blade guide, and wherein the magazine plate, the ejection path, the blade guide, the first and second push levers, and cover are arranged in that order in a direction crossing the moving direction of the striking unit.

11. The driving tool according to claim 10, wherein the ejection unit includes a blade guide and a cover fixed to the blade guide; and wherein at least a part of the first body and at least a part of the second arm are arranged between the blade guide and the cover in the direction crossing the moving direction of the striking unit.

* * * * *